Figure 1:
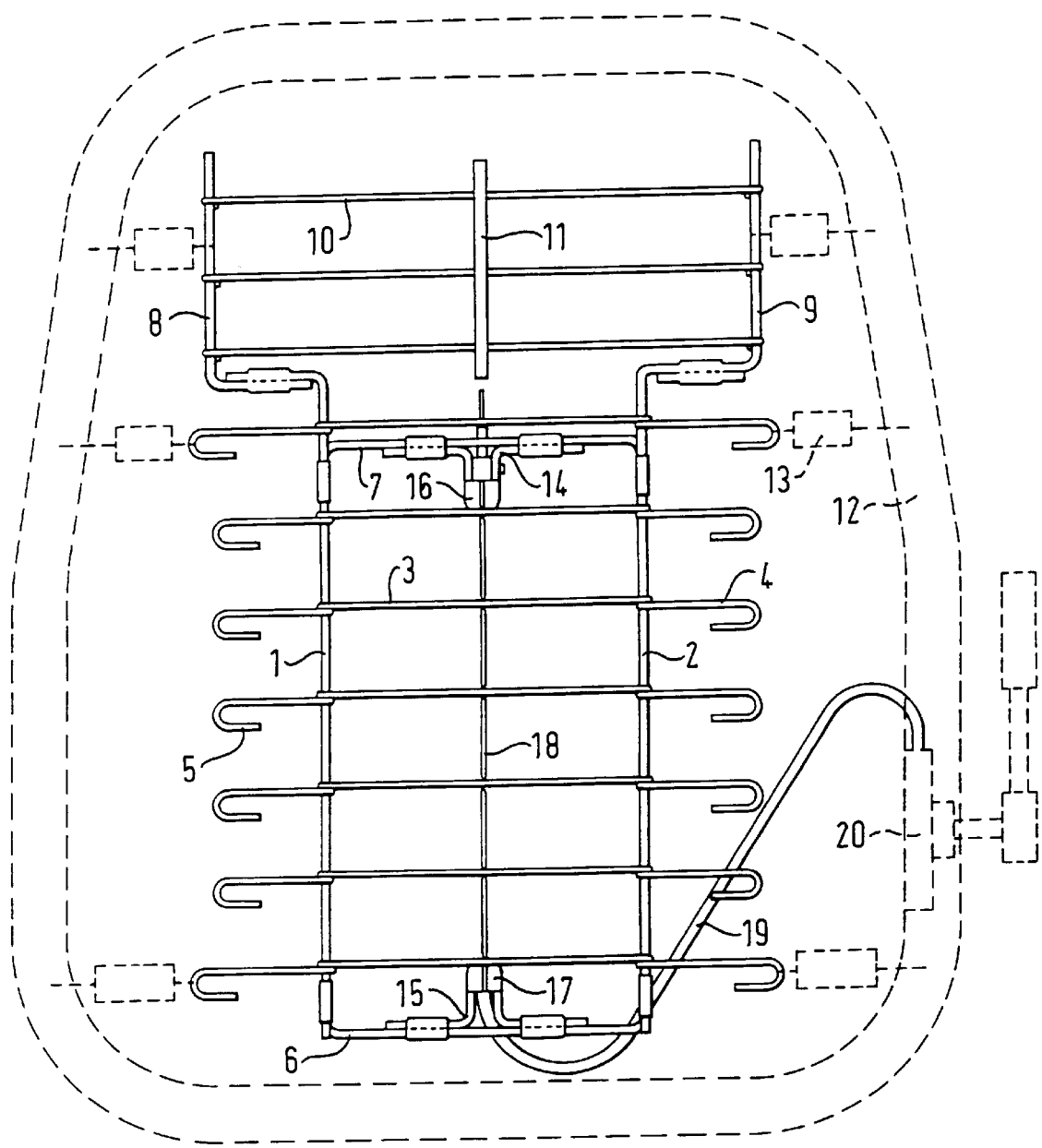

United States Patent

Deceuninck

[11] Patent Number: 5,988,745
[45] Date of Patent: Nov. 23, 1999

[54] SUPPORT STRUCTURES FOR INCORPORATION IN A SEAT FRAME

[75] Inventor: Stefan Deceuninck, Menen, Belgium

[73] Assignee: Youngflex AG, Zug, Switzerland

[21] Appl. No.: 09/101,154

[22] PCT Filed: Jan. 3, 1997

[86] PCT No.: PCT/EP97/00019

§ 371 Date: Jul. 1, 1998

§ 102(e) Date: Jul. 1, 1998

[87] PCT Pub. No.: WO97/24960

PCT Pub. Date: Jul. 17, 1997

[30] Foreign Application Priority Data

Jan. 5, 1996 [GB] United Kingdom ............... 9600161

[51] Int. Cl.⁶ .................................................. A47C 7/46
[52] U.S. Cl. ................................ 297/284.4; 297/452.52
[58] Field of Search ......................... 297/284.1, 284.4, 297/452.49, 452.52, 452.53, 452.34, 452.35

[56] References Cited

U.S. PATENT DOCUMENTS

| | | | |
|---|---|---|---|
| 4,715,653 | 12/1987 | Hattori et al. | 297/284.4 |
| 5,050,930 | 9/1991 | Schuster et al. | 297/284.4 |
| 5,518,294 | 5/1996 | Ligon, Sr. et al. | 297/284.4 |

FOREIGN PATENT DOCUMENTS

| | | |
|---|---|---|
| 0552904 | 7/1993 | European Pat. Off. . |
| 2386287 | 11/1978 | France . |
| 9400039 | 1/1994 | WIPO . |

Primary Examiner—Peter R. Brown
Attorney, Agent, or Firm—Wood, Herron & Evans, LLP

[57] ABSTRACT

A support structure for incorporation into a seat frame comprising a wire framework. The wire framework has two lateral suspended side wires, a plurality of transverse wires, one or more of the transverse wires being wound around the side wires and extending laterally beyond the side wires, and terminating in hook-like fingers. Either the fingers or select transverse wires are secured to the frame in order to suspend the structure.

6 Claims, 2 Drawing Sheets

SUPPORT STRUCTURES FOR INCORPORATION IN A SEAT FRAME

This invention concerns an improved support structure for incorporation in a seat frame, and more especially such a structure comprising a wire framework of the kind having two lateral side wires adapted to be suspended in a seat frame and between which extend a plurality of transverse wires providing load bearing support for upholstery of the seat.

Support structures of the aforementioned kind are very well known and may have various configurations determined by the design of seat in which the support structure is to be mounted.

Whilst such support structures have proved advantageous in hitherto known designs of seat, there is an increasing requirement, particularly in relation to seats for motor vehicles, that the seat back should provide adequate and anatomically correct support for an occupant of the seat in the lumbar region.

It is accordingly an object of the invention to provide a support structure of the aforementioned type that is capable of providing improved lumbar support.

In accordance with the invention a support structure of the aforementioned type is characterised in that one or more transverse wires extend laterally beyond the side wires after having been wound around the latter and terminate in hook-like fingers that extend generally in a plane parallel to a surface of the seat to be supported.

The fact that the extended portions of the transverse wires terminate in free ends acting as fingers, rather than being connected to an edge wire as in hitherto known constructions, enables more versatile lateral support to be provided, particularly in the lumbar region of a back rest, as the fingers can be individually angled, if desired, to conform to the contour of the seat back. The hooked ends of the wire fingers may also provide a convenient means for the suspension of the support structure in a seat frame, serving as anchorages for tension springs or like suspension means.

The fact that the laterally extending fingers are unconnected at their free ends also enables an effective adjustable lumbar support to be provided by arching of the two side wires under the action of a tension means, in known manner, as the freely extending fingers can provide laterally contoured support in the lumbar region without interfering with the arching of the two side wires.

If desired the two side wires may be angled to provide regions of the support structure of differing transverse widths between these side wires. Transverse wires extending between a wider section of the support structure may terminate at the side wires, so that the support structure combines an area having the characteristics of a known flat support with an area having lateral support provided by the extended wire fingers in accordance with the invention.

Figure 2:
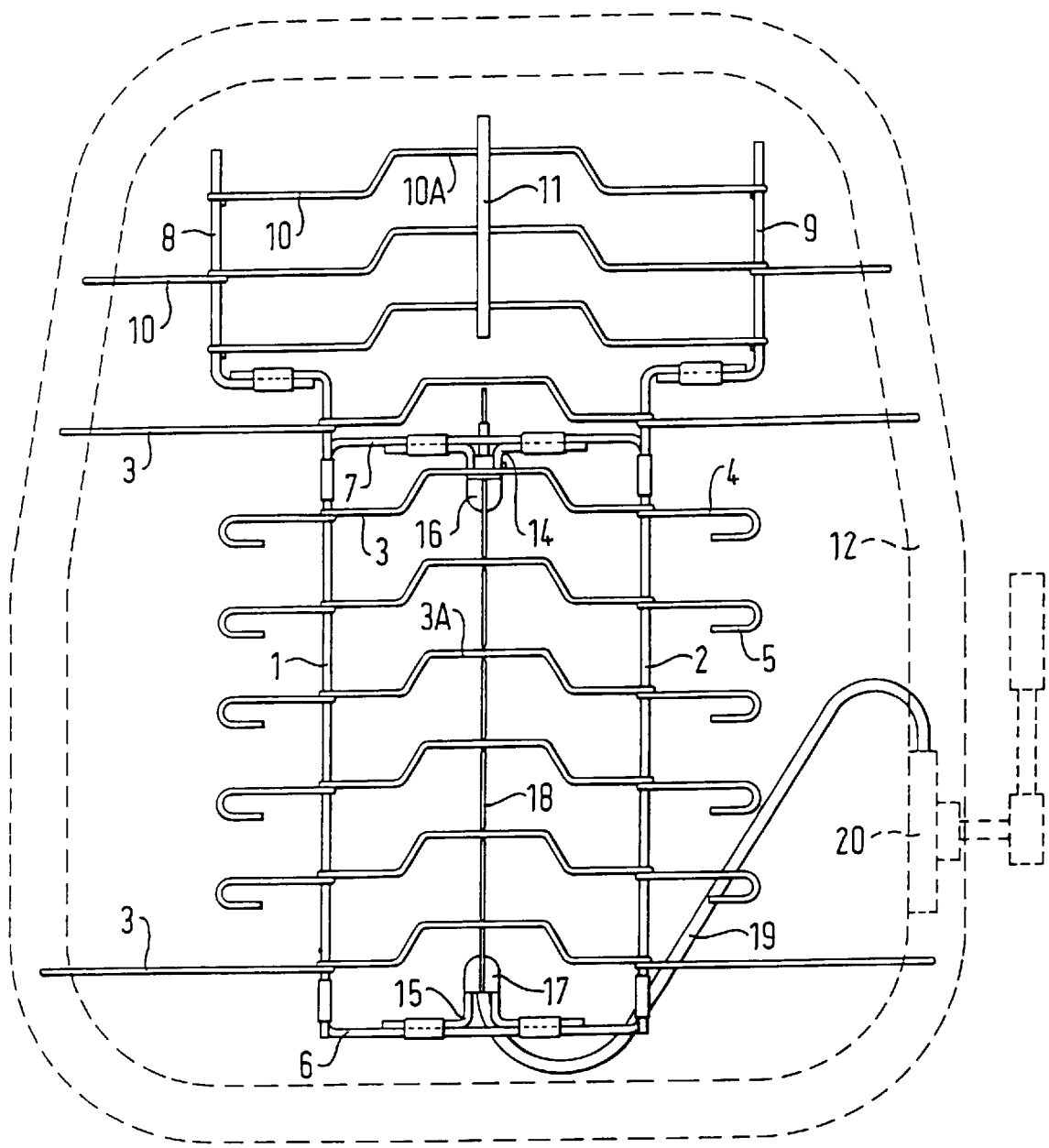

Further preferred features and advantages of the invention will become apparent from the following description taken in conjunction with the drawings, in which FIG. 1 is a front view of a support structure in accordance with one embodiment of the invention, and FIG. 2 is a similar view of a second embodiment of the invention.

Referring to FIG. 1, a support structure comprises a pair of side wires 1 and 2 between which extend a plurality of transverse wires 3 that are anchored to the side wires 1 and 2 by being wound around the latter and then extend beyond the side wires at 4 to terminate in hooked ends 5 that extend generally in the plane of a surface of the seat to be supported.

In known manner the side wires 1 and 2 are provided with a covering of paper or plastic material that is gripped by the wound portions of the wires 3 and serves to maintain the spacing of the latter along the side wires 1 and 2. The lower ends of the wires 1 and 2 as viewed in the drawing are interconnected by a U-shaped transverse wire 6 of similar gauge and construction to the wires 1 and 2, the wire 6 being secured to the wires 1 and 2 by means of clips, in known manner. A similar transverse wire 7 is provided in the region of the upper ends of the wires 1 and 2.

The upper ends of the wires 1 and 2 are angled outwardly as illustrated and are secured to further L-shaped side wires 8 and 9 by means of clips.

The clipping together of the separate wires 1, 8 and 2, 9 allows relative pivotal movement of the linked wires about a transverse axis as described below.

The side wires 8 and 9 are of similar gauge and construction to the wires 1 and 2 and support further transverse wires 10 that are anchored to the side wires in known manner. Also in known manner, the wires 10 extend through a centre cord 11 of paper or synthetic plastic material which serves to maintain the vertical spacing of the wires 10.

The support structure can be supported in a seat frame, indicated in broken lines at 12 in FIG. 1, by means of tension springs indicated in broken lines at 13, anchored between the seat frame 12, the side wires 8 and 9 on the one hand and the hooked ends of upper and lower transverse wires 3 on the other.

The support structure so far described could be used to provide non-adjustable lumbar support, but preferably means is provided for adjustable arching of the side wires 1 and 2 to enable horizontal adjustment of the lumbar support. For this purpose stirrup shaped wires 14 and 15 are clipped to the wires 6 and 7 and provide support for anchor blocks 16 and 17 respectively supporting a cable 18 and outer sheath 19 of a Bowden cable coupled to an actuating mechanism 20 indicated in broken lines and mounted on the seat frame 12. Upon actuation of the cable mechanism, the two anchor blocks 16 and 17 are drawn towards one another under tension thus causing the side wires 1 and 2 to be arched in an adjustable manner in order to provide the required lumbar support.

It will be appreciated that arching of the wires 1 and 2 does not cause undesired displacement of the side wires 8 and 9 in a horizontal direction, as the side wires 8 and 9 can pivot relatively to the wires 1 and 2 about a transverse axis.

If desired, means can also be provided for the vertical displacement of the complete support structure in the seat frame 12 for corresponding vertical adjustment of the position of lumbar support.

The arrangement described provides a novel and versatile support structure particularly for a vehicle seat. The upper part of the support is of optimum width for support of the seat upholstery, whereas the dimension of the lower portion 10 the structure between the side wires 1 and 2 is of the optimum width for providing lumbar support whilst the finger ends of the side wires 3 can be cantilevered to form lateral wings providing sideways support in the lumbar region. All the required support is thus integrated in a single structure having the known advantages of the wire frame wherein the pitch and gauge of transverse wires can be varied to match the suspension loading in a cost effective manner.

The hooks in the transverse wires 3 enable rapid assembly of the structure in a seat frame and can also be used for trimming attachments.

The double cross wire support of the Bowden cable blocks braces the frame to enable application of the single cable tensioning mechanism to the wire frame structure in a simple and economic manner.

If desired the support structure can be tapered to match a seat profile.

Vertical adjustment of the support structure is also facilitated by virtue of the fact that the transverse wires linked to the tension springs 13 can flex in both the horizontal and vertical direction with movement of the support structure.

A further embodiment of the invention is illustrated in FIG. 2 of the drawings in which like components are indicated with the same reference numerals as in FIG. 1, and will not therefore be described in further detail.

In the arrangement of FIG. 2 the tension springs 13 are replaced by extended portions of the transverse wires 3 and 10 that hook directly into apertures in the seat frame 12.

Since the side wires of the support structure are thus linked to the seat frame by inextensible means, intermediate portions 3a and 10a of the transverse wires 3 and 10 are angled in the plane of the support as illustrated, in order that the support structure itself becomes extensible under loading placed upon the seat.

I claim:

1. A support structure for incorporation in a frame of a seat, comprising a wire framework having two lateral side wires suspendible in the frame and between which extend a plurality of transverse wires which provide load-bearing support for upholstery of the seat, wherein one or more transverse wires extend laterally beyond the side wires after having been wound around the latter, characterised in that said one or more transverse wires terminate in free ends that can flex independently of one another relatively to a portion of the framework bounded by said side wires, the said free ends being formed into hook-like fingers.

2. A structure as claimed in claim 1, further characterised in that the fingers are individually angled to conform to the contour of the seat surface and extend in a plane generally parallel to the wire framework.

3. A structure as claimed in claim 1 or 2, further comprising tension springs extending between the seat frame and selected ones of said fingers.

4. A structure as claimed in claim 1, further characterised in that the side wires are angled to provide regions of the structure of differing transverse width between the side wires.

5. A structure as claimed in claim 4, further characterised in that at least some of the transverse wires (10) terminate at the side wires (8,9) in one or more regions of greater width.

6. A structure as claimed in claim 1, further characterised in that a pair of stirrup shaped wires are fastened respectively to spaced-apart transverse wires each of which stirrup shaped wires provide support for an anchor block respectively supporting a cable and an outer sheath of a bowden cable coupled to an actuating mechanism adapted to be mounted on the frame, the arrangement being such that upon actuation of the mechanism in a first sense, the two anchor blocks are drawn towards one another under tension thus causing the side wires to become arched in an adjustable manner whilst actuation in a second sense causes the anchor blocks to move apart causing the side wires to become less arched.

* * * * *